(12) United States Patent
Otani

(10) Patent No.: US 9,480,912 B2
(45) Date of Patent: Nov. 1, 2016

(54) GAME DEVICE, GAME DEVICE CONTROL METHOD, PROGRAM, AND INFORMATION STORAGE MEDIUM

(75) Inventor: Taku Otani, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 823 days.

(21) Appl. No.: 13/122,295

(22) PCT Filed: Jun. 30, 2009

(86) PCT No.: PCT/JP2009/062006
§ 371 (c)(1),
(2), (4) Date: Apr. 1, 2011

(87) PCT Pub. No.: WO2010/038526
PCT Pub. Date: Apr. 8, 2010

(65) Prior Publication Data
US 2011/0190059 A1 Aug. 4, 2011

(30) Foreign Application Priority Data
Oct. 2, 2008 (JP) .................. 2008-257882

(51) Int. Cl.
*A63F 13/00* (2014.01)
*A63F 13/214* (2014.01)
*A63F 13/42* (2014.01)
*A63F 13/40* (2014.01)

(52) U.S. Cl.
CPC ............. *A63F 13/214* (2014.09); *A63F 13/10* (2013.01); *A63F 13/42* (2014.09); *A63F 2300/1068* (2013.01); *A63F 2300/6027* (2013.01)

(58) Field of Classification Search
CPC ...... A63F 13/20; A63F 13/21; A63F 13/214; A63F 13/2145
USPC .................................. 463/16, 25, 30, 36, 40
See application file for complete search history.

(56) References Cited

U.S. PATENT DOCUMENTS

| | | | |
|---|---|---|---|
| 6,572,108 B1 * | 6/2003 | Bristow | A63F 13/06 273/148 B |
| 7,877,171 B2 * | 1/2011 | Gassner | G05G 1/305 200/86.5 |
| 2003/0013523 A1 * | 1/2003 | Tashiro et al. | 463/32 |
| 2008/0146329 A1 | 6/2008 | Kodama et al. | |

(Continued)

FOREIGN PATENT DOCUMENTS

| | | |
|---|---|---|
| CN | 1745360 A | 3/2006 |
| JP | 2001-246154 A | 9/2001 |
| JP | 2002-273038 A | 9/2002 |
| JP | 2006-247258 A | 9/2006 |

(Continued)

*Primary Examiner* — James S McClellan
(74) *Attorney, Agent, or Firm* — Sughrue Mion, PLLC

(57) ABSTRACT

A game device is provided. The game device includes a depression operation receiver that receives a depression operation of a player and outputs information regarding a position depressed by the player; a depressed position acquirer that acquires the position depressed by the player based on the information output; a controller that determines whether the position depressed by the player is included within a judgment subject area, executes game processing based on a result of the determination, and changes, in a case where it is determined that the position depressed by the player is not included within the judgment subject area, a position of the judgment subject area based on the position depressed by the player.

18 Claims, 8 Drawing Sheets

(56) References Cited

U.S. PATENT DOCUMENTS

| | | | |
|---|---|---|---|
| 2009/0036213 A1* | 2/2009 | Masuyama et al. | 463/37 |
| 2009/0258704 A1 | 10/2009 | Asami | |
| 2010/0113147 A1* | 5/2010 | Chosogabe et al. | 463/30 |
| 2010/0240428 A1* | 9/2010 | Mori | 463/3 |
| 2012/0004032 A1* | 1/2012 | Masuyama et al. | 463/31 |

FOREIGN PATENT DOCUMENTS

| | | |
|---|---|---|
| JP | 2007-229450 A | 9/2007 |
| JP | 2008-048932 A | 3/2008 |
| TW | 200639682 A | 11/2006 |
| WO | WO2004/099966 A | 11/2004 |

\* cited by examiner

US 9,480,912 B2

GAME DEVICE, GAME DEVICE CONTROL METHOD, PROGRAM, AND INFORMATION STORAGE MEDIUM

CROSS REFERENCE TO RELATED APPLICATIONS

This application is a National Stage of International Application No. PCT/JP2009/062006 filed Jun. 30, 2009, claiming priority based on Japanese Patent Application No. 2008-257882 filed Oct. 2, 2008, the contents of all of which are incorporated herein by reference in their entirety.

TECHNICAL FIELD

The present invention relates to a game device, a method of controlling a game device, a program, and an information storage medium.

BACKGROUND ART

There is known a game device that includes depression operation receiving means for receiving a depression operation by a player and outputting information regarding a position depressed by the player, and executes game processing based on a result of judgment made as to whether or not the position depressed by the player is included within a judgment subject area.

PRIOR ART DOCUMENT

Patent Document

Patent Document 1: JP 2008-048932 A

DISCLOSURE OF THE INVENTION

Problems to be Solved by the Invention

For example, with a game device that includes depression operation receiving means (for example, a mat-type controller etc.) for outputting information regarding a position at which a player has stepped with their foot, and executes game processing based on a result of judgment made as to whether or not the position of the foot of the player is included within a judgment subject area, there is a case where a standing position of the player is gradually displaced during game play. If the standing position of the player is displaced, the position of the foot of the player is more likely to go outside the judgment subject area, and hence there arises a problem that accurate information is difficult to detect.

The present invention has been made in view of the above-mentioned problem, it is an object of the present invention to provide a game device, a method of controlling a game device, a program, and an information storage medium that, for example, makes it possible to deal with displacement of a standing position of a player during game play.

Means for Solving the Problems

In order to solve the above-mentioned problem, a game device according to the present invention includes: depression operation receiving means for receiving a depression operation of a player and outputting information regarding a position depressed by the player; depressed position acquiring means for acquiring the position depressed by the player based on the information output from the depression operation receiving means; judgment means for judging whether or not the position depressed by the player is included within a judgment subject area; game processing executing means for executing game processing based on a result of the judging by the judgment means; and judgment subject area changing means for changing, in a case where it is judged that the position depressed by the player is not included within the judgment subject area, a position of the judgment subject area based on the position depressed by the player.

Further, a method of controlling a game device according to the present invention includes: acquiring information output from depression operation receiving means for receiving a depression operation of a player and outputting the information regarding a position depressed by the player; acquiring the position depressed by the player based on the information output from the depression operation receiving means; judging whether or not the position depressed by the player is included within a judgment subject area; executing game processing based on a result of the judging; and changing, in a case where it is judged that the position depressed by the player is not included within the judgment subject area, a position of the judgment subject area based on the position depressed by the player.

Further, a program according to the present invention causes a computer, such as a home-use game machine (stationary game machine), a portable game machine, an arcade game machine, a mobile phone, a personal digital assistant (PDA), or a personal computer, to function as: means for acquiring information output from depression operation receiving means for receiving a depression operation of a player and outputting the information regarding a position depressed by the player; depressed position acquiring means for acquiring the position depressed by the player based on the information output from the depression operation receiving means; judgment means for judging whether or not the position depressed by the player is included within a judgment subject area; game processing executing means for executing game processing based on a result of the judging by the judgment means; and judgment subject area changing means for changing, in a case where it is judged that the position depressed by the player is not included within the judgment subject area, a position of the judgment subject area based on the position depressed by the player.

Further, an information storage medium according to the present invention is a computer-readable information storage medium storing the above-mentioned program.

According to the present invention, for example, it is possible to deal with the displacement of the standing position of the player during the game play.

Further, according to an aspect of the present invention, the judgment subject area changing means may include: means for judging whether or not a state in which it is judged that the position depressed by the player is not included within the judgment subject area has continued for a reference period of time; and means for changing the position of the judgment subject area in a case where the state in which it is judged that the position depressed by the player is not included within the judgment subject area has continued for the reference period of time.

Further, according to another aspect of the present invention, the game device may further include display control means for displaying, on display means, a game screen containing a game character and a focused area having brightness thereof set higher than brightness of another area. The display control means may include means for controlling a positional relation between a display position of the game character and a display position of the focused area based on a positional relation between the position depressed by the player and the judgment subject area.

Further, according to a further aspect of the present invention, the game device may further include display control means for displaying, on display means, a game screen containing a first game character and a second game character. The display control means may include means for controlling a positional relation between a display position of the first game character and a display position of the second game character based on a positional relation between the position depressed by the player and the judgment subject area.

BEST MODE FOR CARRYING OUT THE INVENTION

Hereinafter, detailed description is given of an example of an embodiment of the present invention with reference to the drawings. A game device according to the embodiment of the present invention is implemented by, for example, a home-use game machine (stationary game machine), a portable game machine, a mobile phone, a personal digital assistant (PDA), or a personal computer. In this specification, description is given of a case in which the game device according to the embodiment of the present invention is implemented by a home-use game machine.

[1. Configuration]

Figure 1:
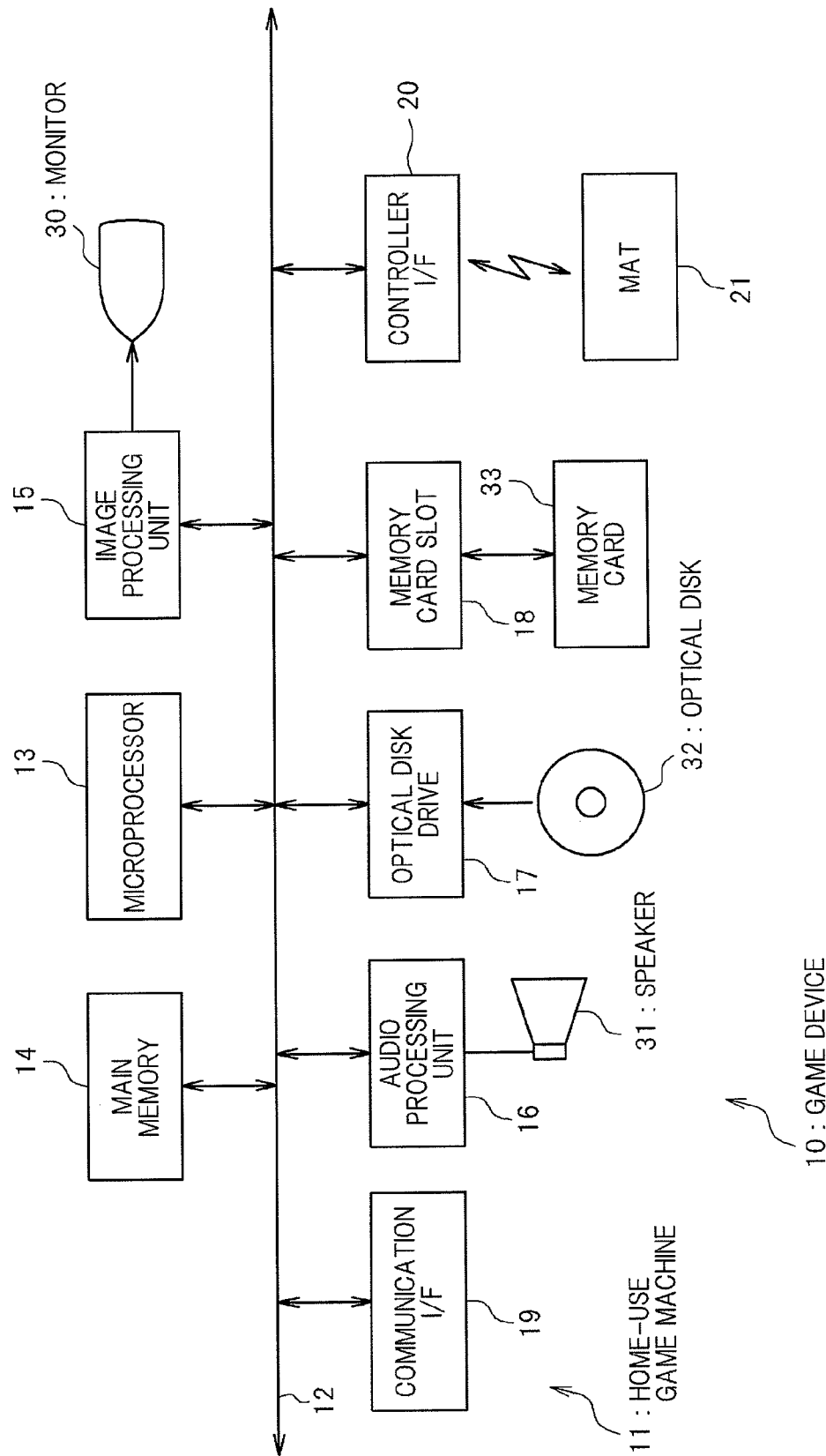
FIG. 1 is a diagram illustrating a hardware configuration of a game device according to an embodiment of the present invention.

FIG. 1 illustrates a configuration of the game device according to this embodiment. As illustrated in FIG. 1, a game device 10 according to this embodiment includes a home-use game machine 11, a monitor 30, a speaker 31, an optical disk 32, and a memory card 33. The monitor 30 and the speaker 31 are connected to the home-use game machine 11. The optical disk 32 and the memory card 33 are information storage media, and are inserted into the home-use game machine 11. For example, a home-use television set is used as the monitor 30, and a speaker integrated into the home-use television set is used as the speaker 31.

The home-use game machine 11 is a publicly-known computer game system, and includes a bus 12, a microprocessor 13, a main memory 14, an image processing unit 15, an audio processing unit 16, an optical disk drive 17, a memory card slot 18, a communication interface (I/F) 19, a controller interface (I/F) 20, and a mat 21. Components other than the mat 21 are accommodated in an enclosure of the home-use game machine 11.

The bus 12 is used for exchanging addresses and data among the components of the home-use game machine 11. The microprocessor 13, the main memory 14, the image processing unit 15, the audio processing unit 16, the optical disk drive 17, the memory card slot 18, the communication interface 19, and the controller interface 20 are connected to one another with the bus 12 so as to be able to communicate data among each other.

The microprocessor 13 executes various types of information processing based on an operating system stored in a ROM (not shown), or a program read from the optical disk 32 or the memory card 33. The main memory 14 includes, for example, a RAM. The program and data read from the optical disk 32 or the memory card 33 are written into the main memory 14 as necessary. The main memory 14 is also used as a working memory for the microprocessor 13.

The image processing unit 15 includes a VRAM, and renders a game screen in the VRAM, based on image data sent from the microprocessor 13. Then, the image processing unit 15 converts the game screen into video signals, and outputs the video signals to the monitor 30 at a predetermined time. The audio processing unit 16 includes a sound buffer, and outputs, from the speaker 31, various types of audio data (game music, game sound effects, message, etc.) that have been read from the optical disk 32 into the sound buffer.

The optical disk drive 17 reads a program or data recorded on the optical disk 32. In this specification, the optical disk 32 is used for supplying the program or the data to the home-use game machine 11. However, another information storage medium, such as the memory card 33, may be used. Alternatively, the program or the data may be supplied to the home-use game machine 11 via a data communication network such as the Internet.

The memory card slot 18 is an interface for the memory card 33 to be inserted into. The memory card 33 includes a nonvolatile memory (for example, EEPROM etc.), and stores various types of game data, such as saved data. The communication interface 19 is an interface for establishing communication connection to a communication network such as the Internet.

The controller interface 20 is an interface for establishing wireless connection to the mat 21. As the controller interface 20, an interface compliant with, for example, the Bluetooth (registered trademark) interface standard may be used. It should be noted that the controller interface 20 may be an interface for establishing wired connection to the mat 21.

Figure 2:
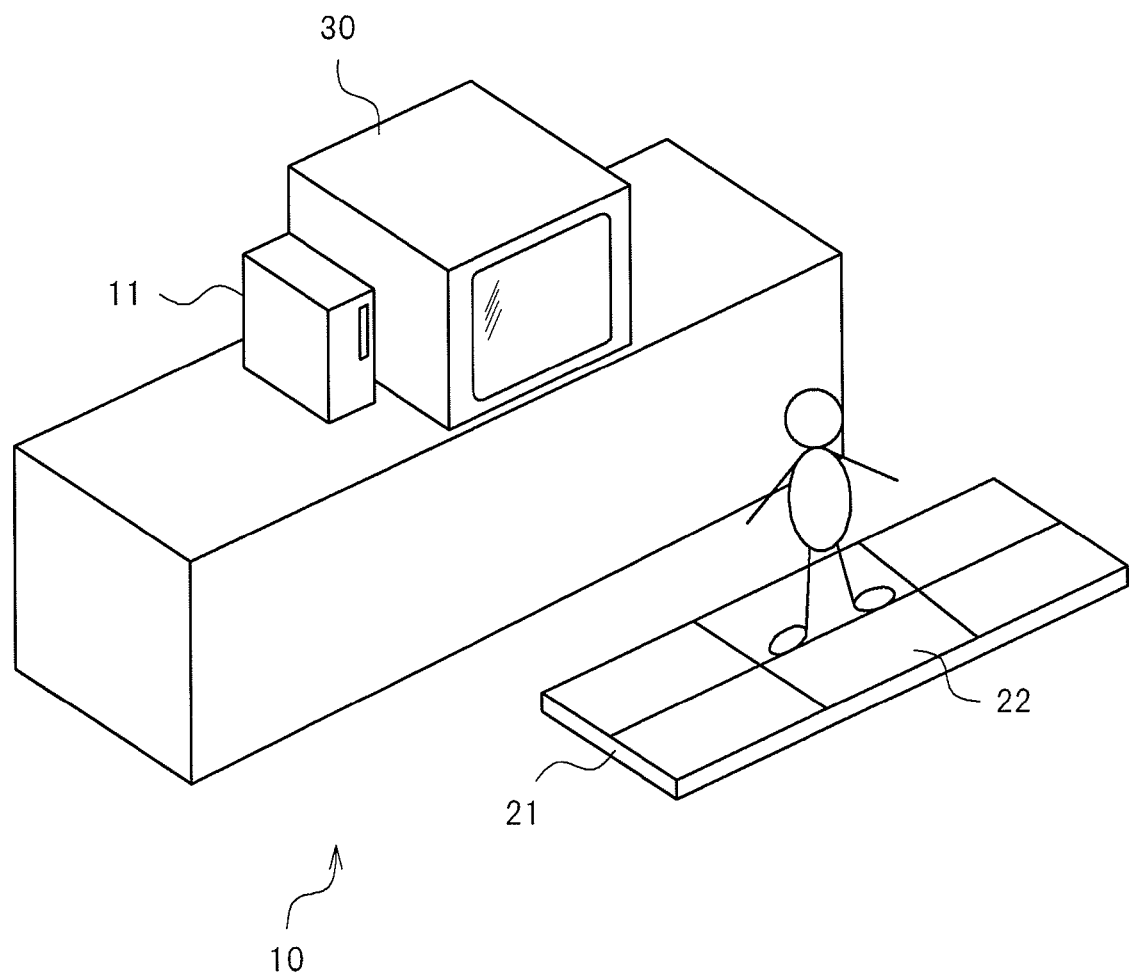
FIG. 2 is a diagram illustrating a situation in which a player is playing a game.

The mat 21 (depression operation receiving means) is a mat-type controller, and is used for receiving a depression operation (stepping action) of a player. FIG. 2 is a diagram for giving a description of the mat 21, and illustrates a situation in which the player is playing a game. As illustrated in FIG. 2, a surface 22 of the mat 21 has a substantially rectangular shape. The mat 21 is placed on a floor in front of the monitor 30. The player stands on the mat 21 to play the game. A plurality of pressure sensitive sensors arranged in a matrix are embedded inside the mat 21. Each of the pressure sensitive sensors detects a pressure caused by, for example, being stepped on by the player, and outputs a numerical value (for example, a numerical value on a scale of 1 to 256) indicating a result of the detection. The numerical value output by each of the pressure sensitive sensors is supplied to the microprocessor 13 via the controller interface 20. Based on results of the detection by the plurality of pressure sensitive sensors embedded in the mat 21, the microprocessor 13 calculates a position at which the player has placed a step.

[2. Game]

The game device 10 executes, for example, a game in which the player changes the position of their foot on the mat 21 according to movement of a foot of a game character displayed on the game screen.

Figure 3:
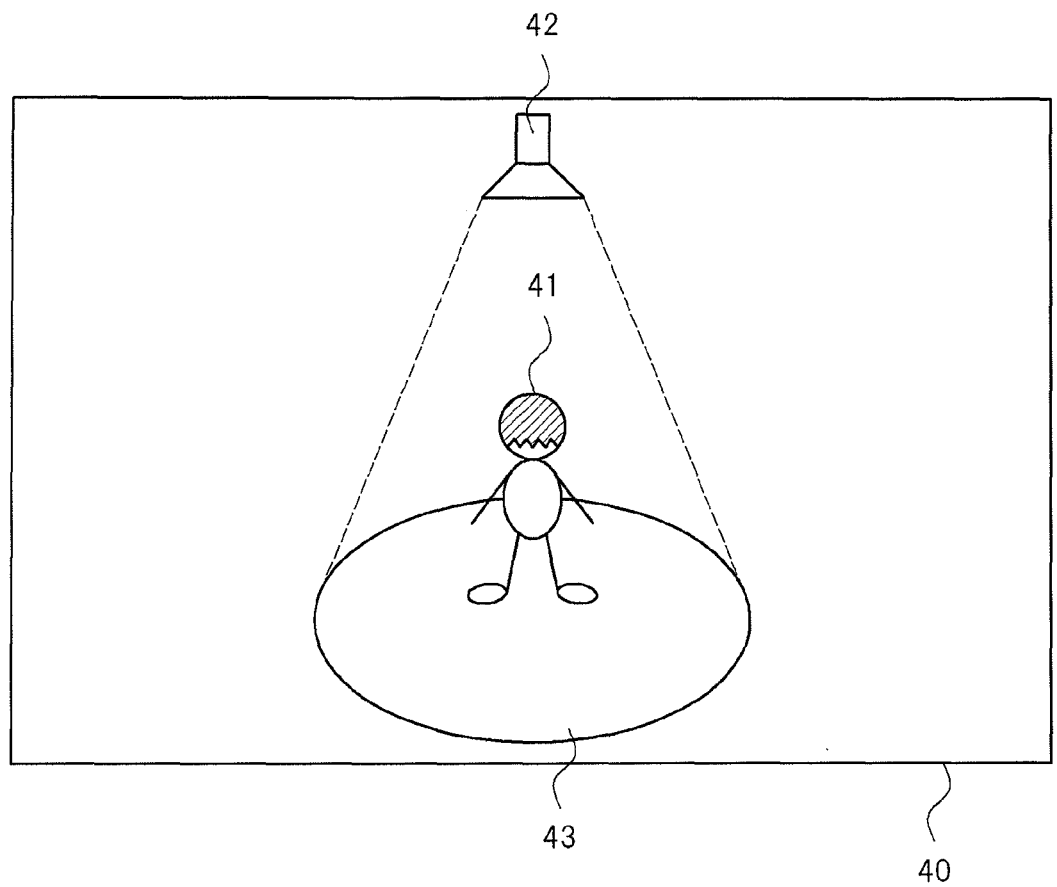
FIG. 3 is a diagram illustrating an example of a game screen.

FIG. 3 illustrates an example of the game screen. A game character 41 is displayed on a game screen 40 illustrated in FIG. 3. In principle, the game character 41 stands within a spotlight area 43 (focused area), which is an area illuminated by a spotlight 42. The spotlight area 43 is an area in which brightness is set higher than brightness of the other area. The area outside the spotlight area 43 is set darker compared to the spotlight area 43, and hence if the game character 41 moves out of the spotlight area 43, the game character 41 becomes difficult to view. By moving a right foot and a left foot, the game character 41 plays a role of giving guidance on a stepping action to be performed by the player. According to the movement of the right foot or the left foot of the game character 41, the player changes the position of their right foot or left foot on the mat 21. For example, if the game character 41 has put the right foot forward, the player puts their right foot forward on the mat 21 as well. Further, for example, if the game character 41 has moved the left foot backward, the player moves their left foot backward on the mat 21 as well. If the player succeeds in moving their right foot or left foot on the mat 21 according to the movement of the right foot or the left foot of the game character 41, a message such as "GOOD" is displayed on the game screen 40.

Figure 4:
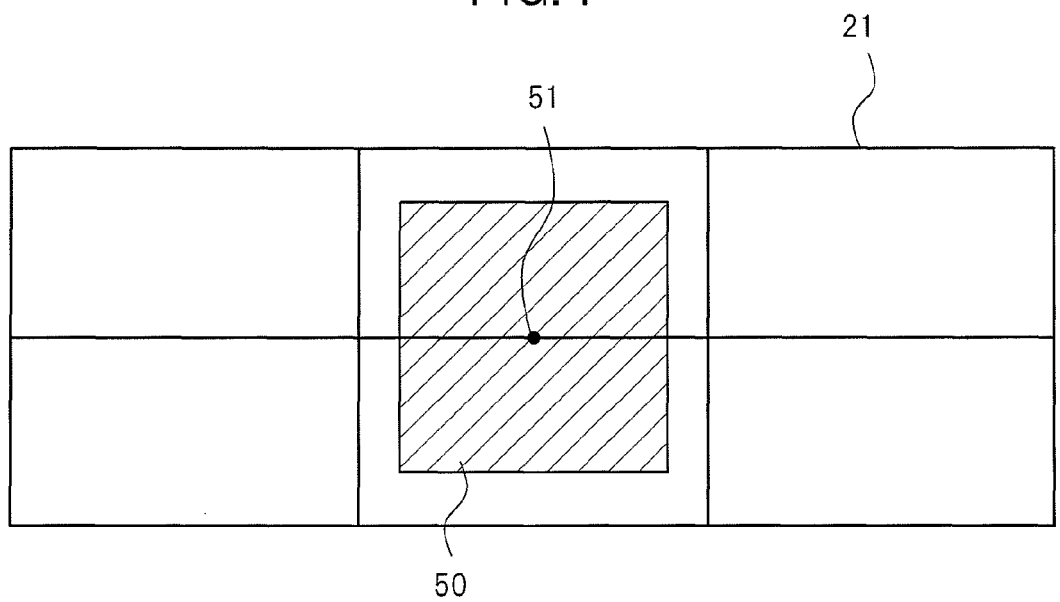
FIG. 4 is a diagram for giving a description of judgment as to movement of a foot of the player.

FIG. 4 is a diagram for giving a description of judgment as to the movement of the foot of the player. As illustrated in FIG. 4, a partial area of the mat 21 is set as a judgment subject area 50. The judgment subject area 50 is an area used for making judgment (judgment as to the movement of the foot of the player) in the game. Specifically, in a case where the position of the foot of the player is within the judgment subject area 50, that position is used for the judgment in the game, and in a case where the position of the foot of the player is not within the judgment subject area 50, that position is not used for the judgment in the game. Further, for example, the position of the right foot or the left foot of the player is represented by relative position coordinates with a representative point 51 of the judgment subject area 50 set as a reference point. In the example illustrated in FIG. 4, a center point of the judgment subject area 50 is set as the representative point 51. It should be noted that the representative point 51 of the judgment subject area 50 may be a point other than the center point (for example, top-left vertex). Further, in the example illustrated in FIG. 4, the shape of the judgment subject area 50 is substantially rectangular, but the shape of the judgment subject area 50 may be a shape other than a rectangular shape.

Figure 5:
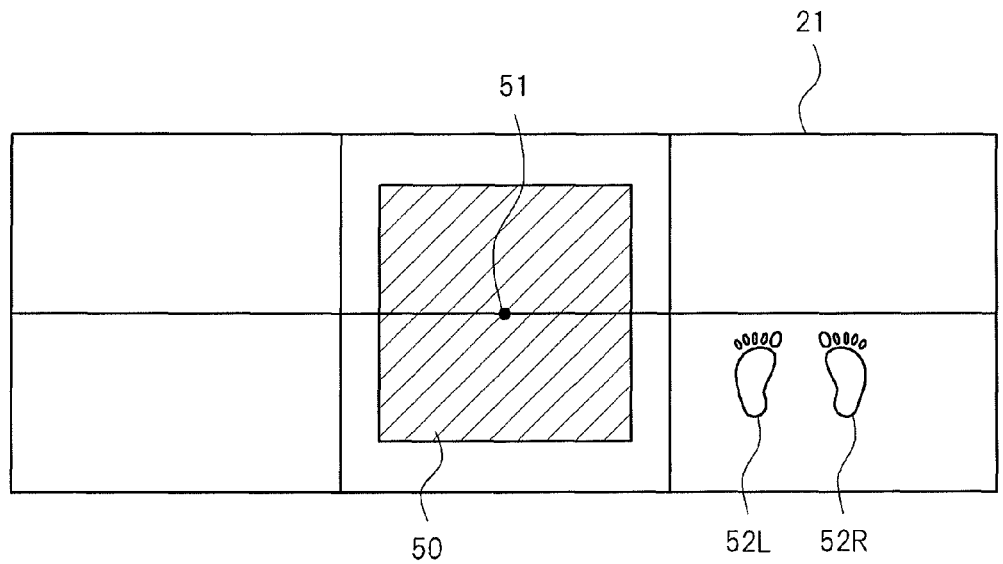
FIG. 5 is a diagram illustrating an example of a standing position of the player.

In such a game as described above, there is a case where the standing position of the player (for example, position obtained by orthogonally projecting the center of the player's body (abdomen) on the mat 21) gradually changes during game play, and the position of a right foot 52R or a left foot 52L of the player eventually becomes outside the judgment subject area 50 as illustrated in FIG. 5, for example. If the standing position of the player is displaced, the position of the foot of the player is more likely to become outside the judgment subject area, and hence there arises a problem that accurate information becomes difficult to detect. Hereinbelow, description is given of technology for dealing with such inconvenience that the standing position of the player gradually changes during the game play.

[3. Functional Blocks]

Figure 6:
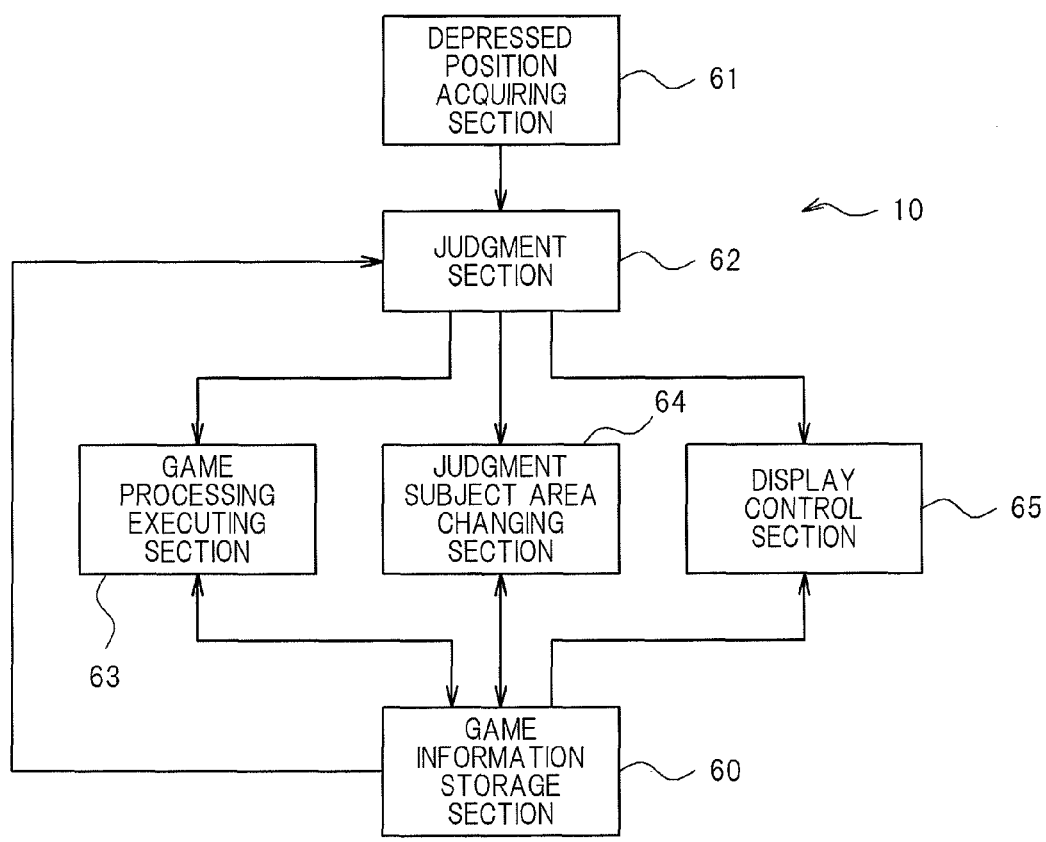
FIG. 6 is a functional block diagram of the game device according to the embodiment of the present invention.

FIG. 6 is a functional block diagram mainly illustrating, of functions implemented by the game device 10, functions relevant to the present invention. As illustrated in FIG. 6, the game device 10 includes a game information storage section 60, a depressed position acquiring section 61, a judgment section 62, a game processing executing section 63, a judgment subject area changing section 64, and a display control section 65. The game information storage section 60 is implemented by, for example, the main memory 14 and the optical disk 32. The depressed position acquiring section 61, the judgment section 62, the game processing executing section 63, the judgment subject area changing section 64, and the display control section 65 are mainly implemented by, for example, the microprocessor 13. The depressed position acquiring section 61, the judgment section 62, the game processing executing section 63, the judgment subject area changing section 64, and the display control section 65 are implemented by the microprocessor 13 executing the program stored in the optical disk 32.

The game information storage section 60 stores information necessary for executing the game. For example, animation information for showing the game character 41 moving the right foot and the left foot is stored in the game information storage section 60. Further, for example, judgment criterion information that serves as a criterion for making judgment as to whether or not the player has moved their right foot or left foot on the mat 21 according to the movement of the right foot or the left foot of the game character 41 is stored in the game information storage section 60. For example, the judgment criterion information is such information that specifies at what time and at what position on the mat 21 the player should place a step in order to be judged as having moved their right foot or left foot on the mat 21 according to the movement of the right foot or the left foot of the game character 41.

Further, for example, judgment subject area information for identifying the judgment subject area 50 is stored in the game information storage section 60. For example, the judgment subject area information for the case where the shape of the judgment subject area 50 is rectangular is information indicating the distances of sides of the judgment subject area 50 and the position of the representative point 51. It should be noted that the judgment subject area information for the case where the shape of the judgment subject area 50 is rectangular may be information indicating the top-left vertex and the bottom-right vertex of the judgment subject area 50.

The depressed position acquiring section 61 acquires a position depressed by the player. In this embodiment, based on information (results of detection by the plurality of pressure sensitive sensors) supplied from the mat 21, the depressed position acquiring section 61 acquires a position on the mat 21 which is depressed by the right foot of the player (position of the right foot) and a position on the mat 21 which is depressed by the left foot of the player (position of the left foot).

The judgment section 62 judges whether or not the position depressed by the player which is acquired by the depressed position acquiring section 61 is included within the judgment subject area 50. The game processing executing section 63 executes game processing based on a result of judgment by the judgment section 62. Detailed description of operation of the game processing executing section 63 is given later (see S105 and S106 of FIG. 7).

In a case where the position depressed by the player which is acquired by the depressed position acquiring section 61 is not included within the judgment subject area 50, the judgment subject area changing section 64 changes the position of the judgment subject area 50 based on the position depressed by the player. Detailed description of operation of the judgment subject area changing section 64 is given later (see S107 and S108 of FIG. 7).

The display control section 65 displays the game screen 40 on the monitor 30. Based on a positional relation between the position depressed by the player which is acquired by the depressed position acquiring section 61 and the position of the judgment subject area 50, the display control section 65 controls a positional relation between a display position of the game character 41 and a display position of the spotlight area 43. Detailed description of operation of the display control section 65 is given later (see S102 of FIG. 7).

[4. Processing]

Figure 7:
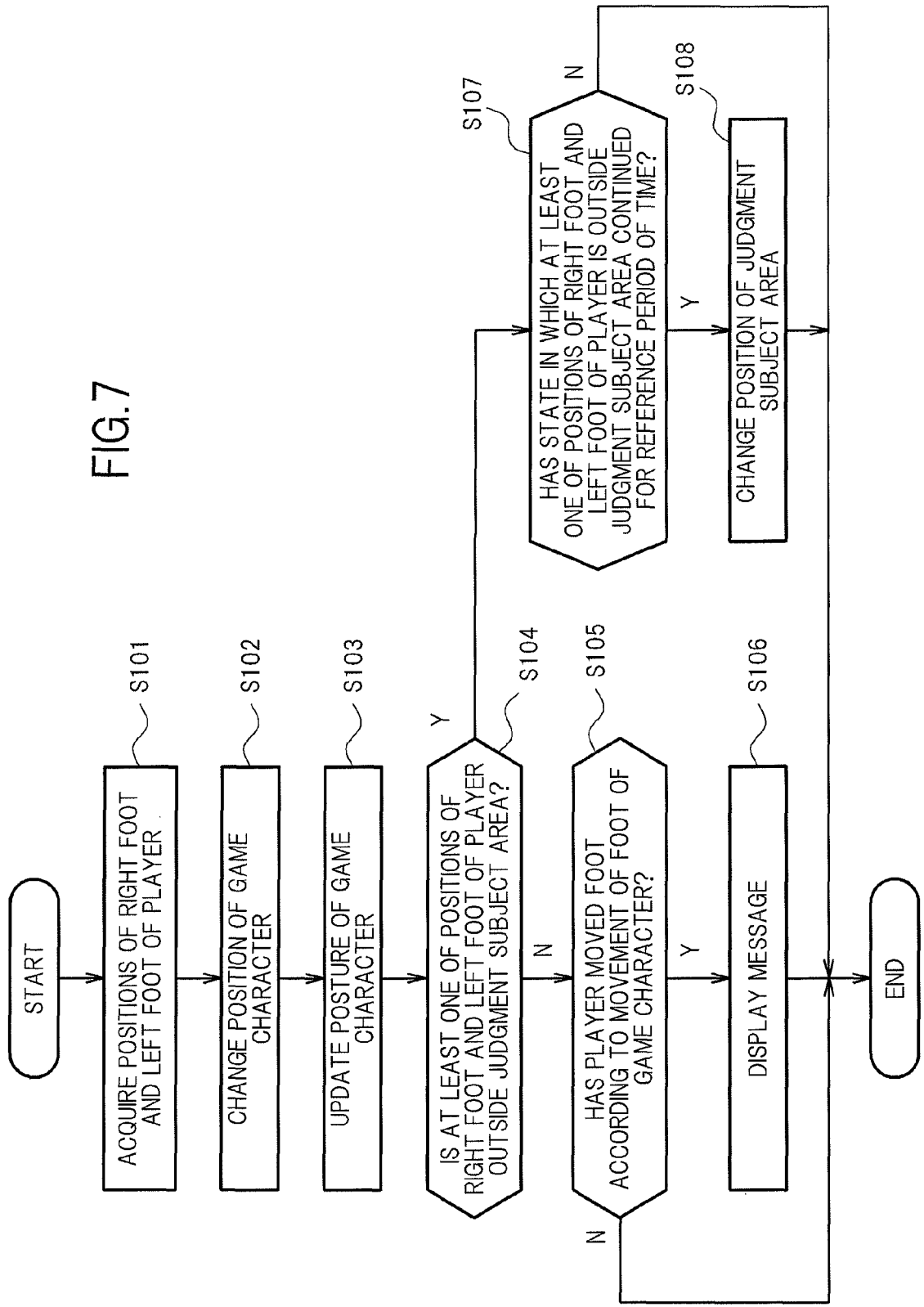
FIG. 7 is a flow chart illustrating processing executed by the game device.

Here, description is given of processing executed by the game device 10. FIG. 7 is a flow chart illustrating processing executed by the game device 10 at predetermined time intervals (for example, 1/60$^{th}$ of a second) during the game. The microprocessor 13 executes the processing illustrated in FIG. 7 according to a program read from the optical disk 32. The microprocessor 13 executes the processing illustrated in FIG. 7, to thereby implement the depressed position acquiring section 61, the judgment section 62, the game processing executing section 63, the judgment subject area changing section 64, and the display control section 65.

As illustrated in FIG. 7, first, the microprocessor 13 (depressed position acquiring section 61) acquires the positions of the right foot and the left foot of the player (S101). Specifically, the position on the mat 21 at which the player has stepped with their right foot and the position on the mat 21 at which the player has stepped with their left foot are acquired based on results of the detection by the plurality of pressure sensitive sensors embedded in the mat 21.

Figure 8:
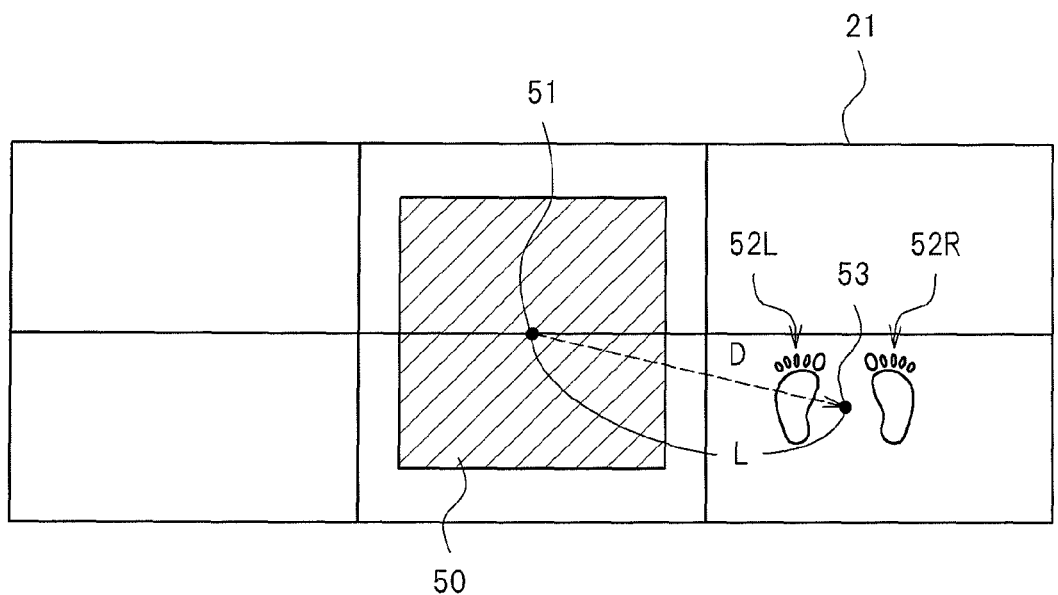
FIG. 8 is a diagram for giving a description of an example of processing for changing a display position of a game character.
Figure 9:
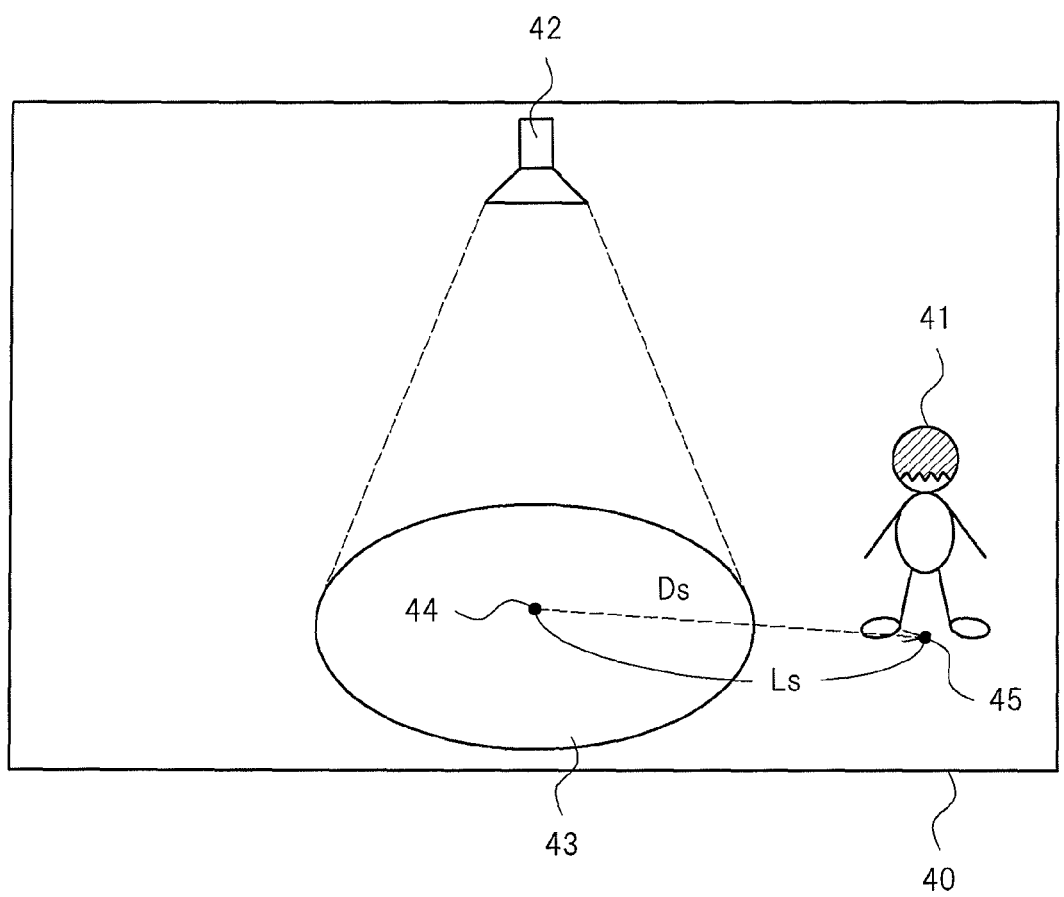
FIG. 9 is a diagram for giving a description of the example of the processing for changing the display position of the game character.

After that, the microprocessor 13 (display control section 65) changes the position of the game character 41 to be displayed on the game screen 40 (S102). FIGS. 8 and 9 are diagrams for describing processing of this step. In this step, first, the position of the center of gravity of the player is acquired. The position of the center of gravity of the player is acquired based on results of the detection by the plurality of pressure sensitive sensors embedded in the mat 21. For example, as illustrated in FIG. 8, a middle point 53 between the position of the right foot 52R of the player and the position of the left foot 52L of the player is acquired as the position of the center of gravity of the player. After that, judgment is made as to a positional relation between the position of the center of gravity of the player (middle point 53) and the representative point 51 of the judgment subject area 50. For example, a difference between the position of the center of gravity of the player (middle point 53) and the representative point 51 of the judgment subject area 50 is acquired. Specifically, a direction D from the representative point 51 of the judgment subject area 50 toward the position of the center of gravity of the player (middle point 53) and a distance L between them are acquired. After that, the display position of the game character 41 is changed so that the positional relation between the display position of the game character 41 and a center position 44 of the spotlight area 43 corresponds to the positional relation between the position of the center of gravity of the player (middle point 53) and the representative point 51 of the judgment subject area 50. For example, as illustrated in FIG. 9, the display position of the game character 41 is changed to a position 45 obtained by shifting from the center position 44 of the spotlight area 43 by a distance Ls corresponding to the above-mentioned distance L in a direction Ds corresponding to the above-mentioned direction D.

The display position of the game character 41 is controlled in the manner described above. Accordingly, by referring to the positional relation between the game character 41 and the spotlight area 43 which are displayed on the game screen 40, the player can recognize whether or not the position of the right foot or the left foot of the player is outside the judgment subject area 50. As a result, the player can adjust their own standing position. Further, if the game character 41 has moved out of the spotlight area 43, the game character 41 becomes difficult to view. For this reason, it is conceivable that the player is likely to adjust their own standing position unconsciously so that the game character 41 will be positioned within the spotlight area 43. Thus, by controlling the display position of the game character 41 in the manner described above, it also becomes possible to make the player adjust their own standing position unconsciously.

Further, the microprocessor 13 (display control section 65) updates the posture of the game character 41 displayed on the game screen 40 based on animation data (S103).

After that, the microprocessor 13 (judgment section 62) judges whether or not at least one of the positions of the right foot and the left foot of the player is outside the judgment subject area 50 (S104). This judgment is made based on the judgment subject area information.

If neither of the positions of the right foot and the left foot of the player is outside the judgment subject area 50, that is, if both of the positions of the right foot and the left foot of the player are within the judgment subject area 50, the microprocessor 13 (game processing executing section 63) judges whether or not the player has moved their right foot or left foot according to the movement of the right foot or the left foot of the game character 41 (S105). In other words, it is judged whether or not the player has conducted movement similar to the movement (movement of the right foot and the left foot) conducted by the game character 41. This judgment is executed based on the judgment criterion information. For example, a case where the game character 41 puts the right foot forward is assumed. In this case, it is judged whether or not the player has put their right foot forward within a predetermined period of time including a timing at which the game character 41 puts the right foot forward (hereinbelow, referred to as "reference step time"). Here, the "predetermined period of time" is, for example, a period of time from a start time that is a predetermined time before the reference step time until an end time that is a predetermined time after the reference step time. If the player has put their right foot forward within the above-mentioned predetermined period of time, it is judged that the player has moved their foot according to the movement of the foot of the game character 41. If it is judged that the player has moved their foot according to the movement of the foot of the game character 41, the microprocessor 13 (game processing executing section 63) displays a message such as "GOOD" on the game screen (S106).

Figure 10:
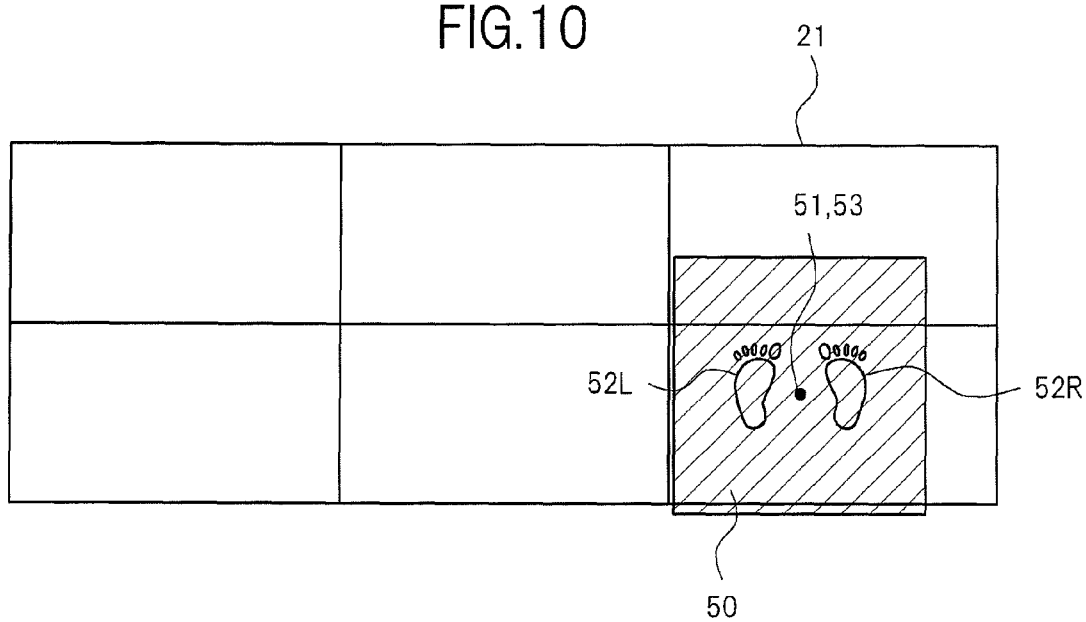
FIG. 10 is a diagram for giving a description of an example of processing for changing a position of a judgment subject area.

On the other hand, if at least one of the positions of the right foot and the left foot of the player is outside the judgment subject area 50, the microprocessor 13 (judgment subject area changing section 64) judges whether or not a state in which the at least one of the positions of the right foot and the left foot of the player is outside the judgment subject area 50 has continued for a reference period of time (for example, 3 seconds) (S107). Then, if the state in which the at least one of the positions of the right foot and the left foot of the player is outside the judgment subject area 50 has continued for the reference period of time, the microprocessor 13 (judgment subject area changing section 64) changes the position of the judgment subject area 50 (S108). FIG. 10 is a diagram for describing processing of this step. In this step, first, the position of the center of gravity of the player is acquired. The position of the center of gravity of the player is acquired based on results of the detection by the plurality of pressure sensitive sensors embedded in the mat 21. For example, as illustrated in FIG. 10, the middle point 53 between the position of the right foot 52R of the player and the position of the left foot 52L of the player is acquired as the position of the center of gravity of the player. After that, the position of the judgment subject area 50 is changed so that the representative point 51 of the judgment subject area 50 coincides with the position of the center of gravity of the player (middle point 53). As a result, as illustrated in FIG. 10, the positions of the right foot 52R and the left foot 52L of the player are included within the judgment subject area 50.

[5. Summary]

In the game device 10 described above, based on the positional relation between the position of the judgment subject area 50 and the positions of the right foot and the left foot of the player, the positional relation between the display position of the game character 41 and the display position of the spotlight area 43 is controlled. For example, in the case where the positions of the right foot and the left foot of the player are outside the judgment subject area 50, the game character 41 is positioned outside the spotlight area 43 (see FIG. 9). With the game device 10, by referring to the positional relation between the game character 41 and the spotlight area 43 which are displayed on the game screen 40, the player can recognize whether or not the positions of the right foot and the left foot of the player are outside the judgment subject area 50. As a result, in a case where the standing position of the player has changed during the game play, the player can know that their standing position has changed, and accordingly can adjust their own standing position. Further, in the case where the game character 41 has moved out of the spotlight area 43, the game character 41 becomes difficult to view. Accordingly, it is conceivable that the player is likely to adjust their own standing position unconsciously in order to position the game character 41 within the spotlight area 43. As described above, with the game device 10, it becomes possible to make the player adjust their own standing position unconsciously.

Further, with the game device 10, in the case where the state in which at least one of the positions of the right foot and the left foot of the player is outside the judgment subject area 50 has continued for the reference period of time (for example, 3 seconds), the position of the judgment subject area 50 is changed so that the positions of the right foot and the left foot of the player are included within the judgment subject area 50 (see FIG. 10). With the game device 10, in the state in which at least one of the positions of the right foot and the left foot of the player is outside the judgment subject area 50 due to the fact that the standing position of the player has changed during the game play, it is possible to continue the game even if the player does not adjust their standing position.

It should be noted that in the game device 10, the position of the judgment subject area 50 is changed only in the case where the state in which at least one of the positions of the right foot and the left foot of the player is outside the judgment subject area 50 has continued for the reference period of time (for example, 3 seconds) (see S107 of FIG. 7). For example, if the position of the judgment subject area 50 is changed even in a case where at least one of the positions of the right foot and the left foot of the player is outside the judgment subject area 50 for a brief moment, the player may become confused instead. In this respect, the game device 10 is configured so that the player does not feel such confusion.

[6. Modified Example]

It should be noted that the present invention is not limited to the embodiment described above.

[6-1. First Modified Example]

In S102 of FIG. 7, the display position of the spotlight area 43 (and the spotlight 42) may be changed so that the positional relation between the display position of the game character 41 and the center position of the spotlight area 43 corresponds to the positional relation between the position of the center of gravity of the player and the representative point 51 of the judgment subject area 50. Alternatively, the display positions of both the game character 41 and the spotlight area 43 (and the spotlight 42) may be changed so that the positional relation between the display position of the game character 41 and the center position of the spotlight area 43 corresponds to the positional relation between the position of the center of gravity of the player and the representative point 51 of the judgment subject area 50.

[6-2. Second Modified Example]

Figure 11:
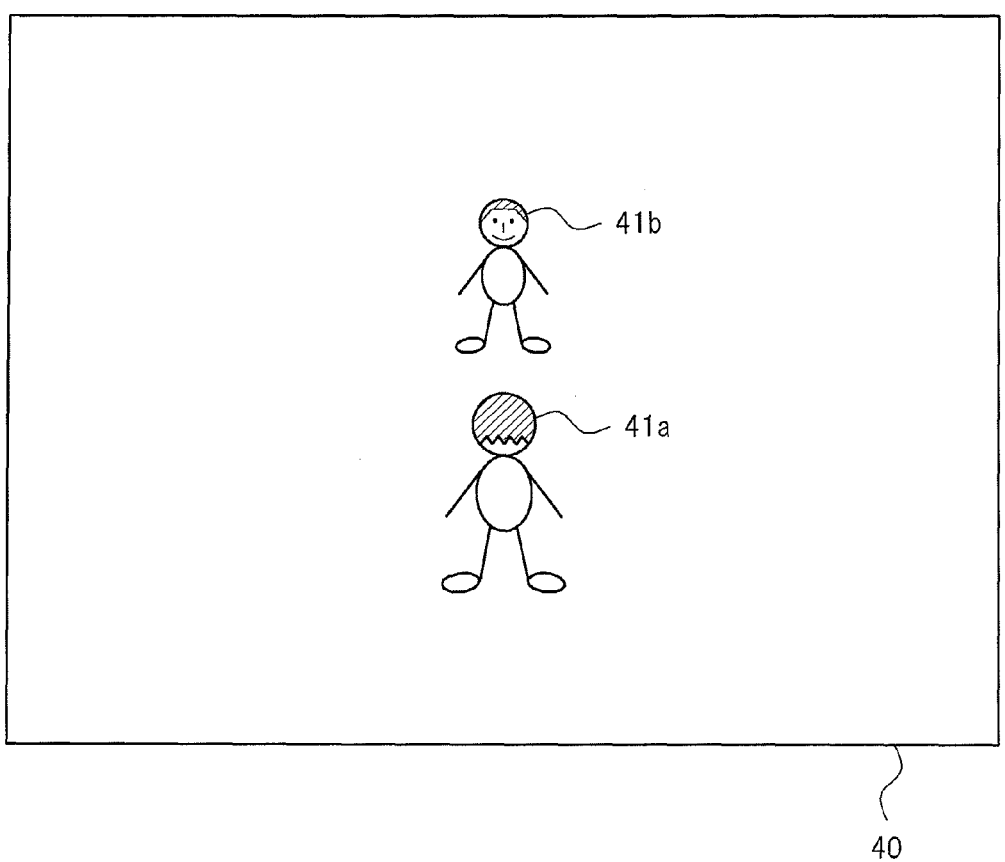
FIG. 11 is a diagram illustrating an example of the game screen.

FIG. 11 illustrates another example of the game screen 40. A player character 41a (first game character) corresponding to the player and an instructor character 41b (second game character) are displayed on the game screen 40 illustrated in FIG. 11. In this case, for example, the player moves their feet according to the movement of the instructor character 41b. Then, the player character 41a performs an action based on the movement of the player. Alternatively, the player character 41a and the instructor character 41b may move in the same manner, and the player moves their feet according to the movement of the player character 41a and the instructor character 41b.

Figure 12:
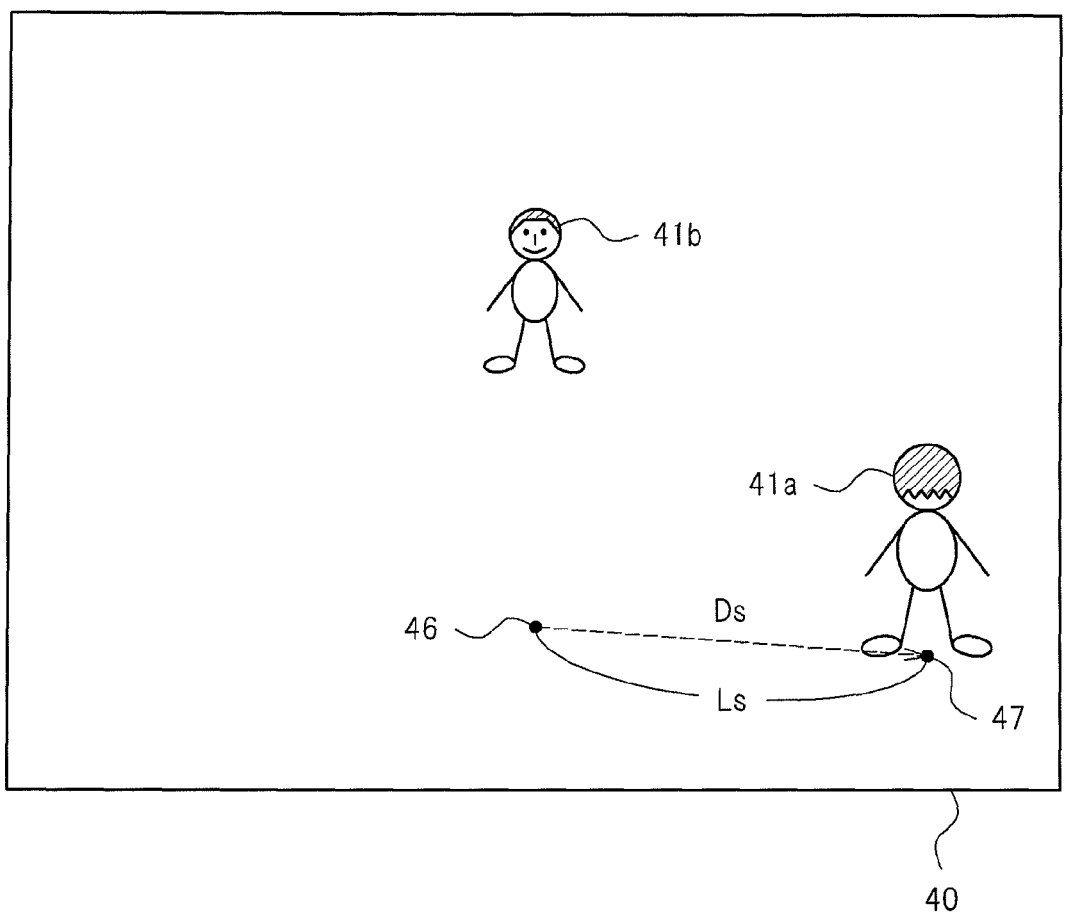
FIG. 12 is a diagram for giving a description of an example of processing for changing a display position of a player character.

In the second modified example, the positional relation between the player character 41a and the instructor character 41b is changed based on the positional relation between the position of the judgment subject area 50 and the positions of the right foot and the left foot of the player. For example, in the case where the positions of both the right foot and the left foot of the player are included within the judgment subject area 50, the player character 41a is displayed substantially in front of the instructor character 41b as illustrated in FIG. 11, for example. On the other hand, in the case where the positions of both the right foot and the left foot of the player are outside the judgment subject area 50 as illustrated in FIG. 5, for example, the player character 41a is displayed at a position significantly displaced from the front of the instructor character 41b as illustrated in FIG. 12, for example.

In the second modified example, for example, processing similar to the processing of S102 of FIG. 7 is executed.

Specifically, at least one of the display positions of the player character 41*a* and the instructor character 41*b* is changed so that the positional relation between the display position of the player character 41*a* and the display position of the instructor character 41*b* corresponds to the positional relation between the representative point 51 of the judgment subject area 50 and the positions of the right foot and the left foot of the player (position of the center of gravity of the player). For example, first, the position of the center of gravity of the player is acquired. The position of the center of gravity of the player is acquired based on results of the detection by the plurality of pressure sensitive sensors embedded in the mat 21. For example, as illustrated in FIG. 8, the middle point 53 between the position of the right foot 52R of the player and the position of the left foot 52L of the player is acquired as the position of the center of gravity of the player. After that, judgment is made as to the positional relation between the position of the center of gravity of the player (middle point 53) and the representative point 51 of the judgment subject area 50. For example, a difference between the position of the center of gravity of the player (middle point 53) and the representative point 51 of the judgment subject area 50 is acquired. Specifically, the direction D from the representative point 51 of the judgment subject area 50 toward the position of the center of gravity of the player (middle point 53) and the distance L between them are acquired. After that, the display position of the player character 41*a* is changed so that the positional relation between the display position of the player character 41*a* and the display position of the instructor character 41*b* corresponds to the positional relation between the position of the center of gravity of the player (middle point 53) and the representative point 51 of the judgment subject area 50. For example, as illustrated in FIG. 12, the display position of the player character 41*a* is changed to a position 47 obtained by shifting from an original position 46 set in front of the instructor character 41*b* by a distance Ls corresponding to the above-mentioned distance L in a direction Ds corresponding to the above-mentioned direction D.

According to the second modified example, by referring to the positional relation between the player character 41*a* and the instructor character 41*b*, the player can recognize whether or not the positions of the right foot and the left foot of the player are outside the judgment subject area 50. As a result, in a case where the standing position of the player has changed during the game play, the player can know that their standing position has changed, and accordingly can adjust their own standing position. Incidentally, in the case where the position of the player character 41*a* is displaced from the front of the instructor character 41*b*, it is generally conceivable that the player will attempt to position the player character 41*a* in front of the instructor character 41*b*. Specifically, in the case where the position of the player character 41*a* is displaced from the front of the instructor character 41*b*, it is conceivable that the player will feel difficulty in following the movement of the instructor character 41*b*. Accordingly, it is conceivable that the player will adjust their own standing position unconsciously so that the player character 41*a* will be positioned in front of the instructor character 41*b*. In this manner, by controlling the positional relation between the player character 41*a* and the instructor character 41*b* as described above, it is also possible to make the player adjust their own standing position unconsciously.

[6-3. Other Modified Examples]

The game device 10 may execute a game configured such that the player depresses the mat 21 with their right hand or left hand. Further, for example, a touch panel (depression operation receiving means) is similar to the mat 21 in that the touch panel receives depression operation of the player and outputs information regarding a position depressed by the player. In view of this, the game device 10 may include a touch panel and execute a game configured such that the player depresses the touch panel. In this case, the depressed position acquiring section 61 acquires a position on the touch panel which is depressed by the player with a stylus pen, a finger, or the like.

The invention claimed is:

1. A game device, comprising:
   a depression operation receiver that receives a depression operation of a player and outputs information regarding a position depressed by the player;
   a depressed position acquirer that acquires the position depressed by the player based on the information;
   a controller that determines whether the position depressed by the player is included within a judgment subject area, executes, in a case where it is determined that the position depressed by the player is included within the judgment subject area, game processing based on the position depressed while maintaining the position of the judgment subject area, and changes, in a case where it is determined that the position depressed by the player is not included within the judgment subject area, a position of the judgment subject area so that the position depressed by the player is included in the judgment subject area.

2. The game device according to claim 1, wherein the controller determines whether a state in which it is determined that the position depressed by the player is not included within the judgment subject area has continued for a reference period of time, and changes the position of the judgment subject area in a case where the state in which it is determined that the position depressed by the player is not included within the judgment subject area has continued for the reference period of time.

3. The game device according to claim 1, further comprising a display controller that displays, on a display, a game screen containing a game character and a focused area having a brightness thereof set higher than a brightness of another area,
   wherein the display controller controls a positional relation between a display position of the game character and a display position of the focused area based on a positional relation between the position depressed by the player and the judgment subject area.

4. The game device according to claim 1, further comprising a display controller that displays, on a display, a game screen containing a first game character and a second game character,
   wherein the display controller controls a positional relation between a display position of the first game character and a display position of the second game character based on a positional relation between the position depressed by the player and the judgment subject area.

5. A method of controlling a game device including at least one processor, the method comprising:
   acquiring, using the at least one processor, information output from a depression operation receiver that receives a depression operation of a player and outputting the information;
   acquiring, using the at least one processor, a position depressed by the player based on the information output from the depression operation receiver;

determining, using the at least one processor, whether the position depressed by the player is included within a judgment subject area;

executing, in a case where it is determined that the position depressed by the player is included within the judgment subject area, game processing based the position depressed while maintaining the position of the judgment subject area; and changing, using the at least one processor in a case where it is determined that the position depressed by the player is not included within the judgment subject area, a position of the judgment subject area so that the position depressed by the player is included in the judgment subject area.

6. A non-transitory computer-readable information storage medium having a program recorded thereon, the program causing a computer to function as:

a depressed position acquiring section that acquires information output from a depression operation receiver that receives a depression operation of a player and acquires a position depressed by the player based on the information;

a judgment section that determines whether the position depressed by the player is included within a judgment subject area;

a game processing executing section that executes, in a case where it is determined that the position depressed by the player is included within the judgment subject area, game processing based the position depressed while maintaining the position of the judgment subject area; and a judgment subject area changing section that changes, in a case where it is determined that the position depressed by the player is not included within the judgment subject area, a position of the judgment subject area so that the position depressed by the player is included in the judgment subject area.

7. A game device comprising:

a controller interface that receives mat depression information from a mat configured to receive a step of a player;

a controller that acquires a position depressed by the player on the mat based on the mat depression information, determines whether the position is included within a subject area on the mat, executes, in a case where it is determined that the position is included within the subject area, processing based on the position depressed by the player while maintaining the position of the subject area, and changes, in a case in which it is determined that the position is not included within the subject area, a position of the subject area so that the position depressed by the player is included in the judgment subject area.

8. The game device according to claim 7, wherein the mat depressing information is sensor information from a plurality of sensors provided in the mat.

9. A game device comprising:

a controller interface that receives mat depression information from a mat configured to receive a step of a player;

a controller that acquires a position of a right foot and a position of a left foot of the player based on the mat depression information, changes a display position of a game character to be displayed on a game screen based on the position of the right foot and left foot, calculates a center of gravity of the player based on the positions of the right foot and left foot, determines a positional relationship between the center of gravity and a representative point of a subject area on the mat, and changes the display position of the game character and a center position of a spotlight area to be displayed on the game screen based on the determined positional relationship.

10. The game device according to claim 9, wherein the controller calculates a direction D from the representative point of the subject area to the center of gravity of the player and a distance L between the representative point and the center of gravity, and changes the display position of the game character to a position obtained by shifting the game character from a center position of the spotlight area by the distance L in the direction D.

11. A method of controlling a game device including at least one processor, the method comprising:

receiving mat depression information from a mat configured to receive a step of a player;

acquiring, using the at least one processor, a position depressed by the player on the mat based on the mat depression information;

determining, using the at least one processor, whether the position is included within a subject area on the mat;

executing, using the at least one processor in a case in which it is determined that the position is included within the subject area, processing based on the position while maintaining the position of the subject area; and changing, using the at least one processor in a case in which it is determined that the position is not included within the subject area, a position of the subject area so that the position depressed by the player is included in the judgment subject area.

12. A non-transitory computer-readable information storage medium having a program recorded thereon, the program causing a computer to function as:

a controller interface that receives mat depression information from a mat configured to receive a step of a player;

a controller that acquires a position depressed by the player on the mat based on the mat depression information, determines whether the position is included within a subject area on the mat, executes, in a case where it is determined that the position is included within the subject area, processing based on the position depressed by the player while maintaining the position of the subject area, and changes, in a case in which it is determined that the position is not included within the subject area, a position of the subject area so that the position depressed by the player is included in the judgment subject area.

13. A method of controlling a game device including at least one processor, the method comprising:

receiving mat depression information from a mat configured to receive a step of a player;

acquiring, using the at least one processor, a position of a right foot and a position of a left foot of the player based on the mat depression information;

changing, using the at least one processor, a display position of a game character to be displayed on a game screen based on the position of the right foot and left foot;

calculating, using the at least one processor, a center of gravity of the player based on the positions of the right foot and left foot;

determining, using the at least one processor, a positional relationship between the center of gravity and a representative point of a subject area on the mat; and changing, using the at least one processor, the display position of the game character and a center position of a spotlight area to be displayed on the game screen based on the determined positional relationship.

14. A non-transitory computer-readable information storage medium having a program recorded thereon, the program causing a computer to function as:

a controller interface that receives mat depression information from a mat configured to receive a step of a player;

a controller that acquires a position of a right foot and a position of a left foot of the player based on the mat depression information, changes a display position of a game character to be displayed on a game screen based on the position of the right foot and left foot, calculates a center of gravity of the player based on the positions of the right foot and left foot, determines a positional relationship between the center of gravity and a representative point of a subject area on the mat, and changes the display position of the game character and a center position of a spotlight area to be displayed on the game screen based on the determined positional relationship.

15. A game device, comprising:

depression operation receiving means for receiving a depression operation of a player and outputting information regarding a position depressed by the player;

depressed position acquiring means for acquiring the position depressed by the player based on the information;

judgment means for determining whether the position depressed by the player is included within a judgment subject area;

game processing executing means for executing, in a case where it is determined that the position depressed is included within the judgment subject area, game processing based the position depressed while maintaining the position of the judgment subject area; and judgment subject area changing means for changing, in a case where it is determined that the position depressed by the player is not included within the judgment subject area, a position of the judgment subject area so that the position depressed by the player is included in the judgment subject area.

16. A non-transitory computer-readable information storage medium having a program recorded thereon, the program causing a computer to function as:

means for acquiring information output from a depression operation receiver that receives a depression operation of a player;

depressed position acquiring means for acquiring a position depressed by the player based on the information;

judgment means for determining whether the position depressed by the player is included within a judgment subject area;

game processing executing means for executing, in a case where it is determined that the position depressed is included within the judgment subject area, game processing based on the position depressed while maintaining the position of the judgment subject area; and judgment subject area changing means for changing, in a case where it is determined that the position depressed by the player is not included within the judgment subject area, a position of the judgment subject area so that the position depressed by the player is included in the judgment subject area.

17. A game device, comprising:

at least one microprocessor configured to:

acquire information output from a depression operation receiver that receives a depression operation of a player;

acquire a position depressed by the player based on the information;

determine whether the position depressed by the player is included within a judgment subject area;

execute, in a case where it is determined that the position depressed is included within the judgment subject area, game processing based on the position depressed while maintaining the position of the judgment subject area; and change, in a case where it is judged that the position depressed by the player is not included within the judgment subject area, a position of the judgment subject area so that the position depressed by the player is included in the judgment subject area.

18. A non-transitory computer-readable information storage medium having a program recorded thereon, the program causing at least one microprocessor of a computer to:

acquire information output from a depression operation receiver that receives a depression operation of a player;

acquire a position depressed by the player based on the information;

determine whether the position depressed by the player is included within a judgment subject area;

execute, in a case where it is determined that the position depressed is included within the judgment subject area, game processing based on the position depressed while maintaining the position of the judgment subject area; and change, in a case where it is judged that the position depressed by the player is not included within the judgment subject area, a position of the judgment subject area so that the position depressed by the player is included in the judgment subject area.

* * * * *